United States Patent
Kuenemund (10) Patent No.: US 8,135,767 B2
(45) Date of Patent: *Mar. 13, 2012

(54) STANDARD CELL FOR ARITHMETIC LOGIC UNIT AND CHIP CARD CONTROLLER

(76) Inventor: Thomas Kuenemund, Munich (DE)

( * ) Notice: Subject to any disclaimer, the term of this patent is extended or adjusted under 35 U.S.C. 154(b) by 1252 days.

This patent is subject to a terminal disclaimer.

(21) Appl. No.: 11/890,966

(22) Filed: Aug. 8, 2007

(65) Prior Publication Data

US 2008/0040414 A1 Feb. 14, 2008

Related U.S. Application Data

(63) Continuation-in-part of application No. 11/501,305, filed on Aug. 9, 2006, now Pat. No. 7,921,148.

(51) Int. Cl.
G06F 7/38 (2006.01)
G06F 7/52 (2006.01)

(52) U.S. Cl. ......................... 708/490; 708/700

(58) Field of Classification Search .................. 708/490, 708/700
See application file for complete search history.

(56) References Cited

U.S. PATENT DOCUMENTS

| 6,476,634 | B1 | 11/2002 | Bilski | |
|---|---|---|---|---|
| 6,973,551 | B1 | 12/2005 | Walton | 711/155 |
| 6,995,555 | B2 | 2/2006 | Graf | 324/126 |
| 7,034,559 | B2 | 4/2006 | Frankowsky et al. | 324/763 |
| 7,921,148 | B2 * | 4/2011 | Kuenemund | 708/490 |
| 2005/0036618 | A1 | 2/2005 | Gammel et al. | 380/255 |

FOREIGN PATENT DOCUMENTS

| DE | 1 008 033 B1 | 6/2000 |
|---|---|---|
| DE | 102 01 449 | 8/2003 |
| WO | WO03060694 A1 * | 7/2003 |

* cited by examiner

*Primary Examiner* — Chuong D Ngo
(74) *Attorney, Agent, or Firm* — Murphy, Bilak & Homiller, PLLC

(57) ABSTRACT

A cell for an arithmetic logic unit includes a first input; a second input; a carry-in input; a first control input and a second control input; and a circuit connected to the first input, the second input, the carry-in input, the first control input, and the second control input. The circuit has a first output and a second output, the second output having a first value as a function of the first input and the second input when the first control input and the second control input are supplied values equal to a value at the carry-in input, and having a second value as a function of the first input and second input when the values at the first control input and the second control input are independent of the value at the carry-in input.

17 Claims, 6 Drawing Sheets

Masked Mirror ALU Cell (bit position p)

Figur 1: Mirror Adder

Figur 2: Masked Mirror ALU Data-Path

Figur 3: Masked Mirror ALU Control

Figur 4: Masked Mirror ALU Cell (bit position p)

Figur 5: XOR3 Transmission Gate Implementation

Figur 6: Mirror ALU Control

STANDARD CELL FOR ARITHMETIC LOGIC UNIT AND CHIP CARD CONTROLLER

This application is a continuation-in-part of application Ser. No. 11/501,305, filed Aug. 9, 2006, now U.S. Pat. No. 7,921,148 entitled STANDARD CELL FOR ARITHMETIC LOGIC UNIT AND CHIP CARD CONTROLLER, hereby incorporated by reference.

BACKGROUND INFORMATION

The present invention relates generally to processors and controllers and standard cells for arithmetic logic units (ALUs) in such processors and controllers.

A standard cell for ALUs in microcontrollers may be implemented using a semi-custom design style. Chip card controllers have to meet high requirements in terms of resistance to invasive probing and/or non-invasive differential power analysis (DPA) of security-critical information. One prior art device uses bitwise XOR masking of all data using time-variant masks, so-called "one-time pad (OTP)" masks.

Figure 1:
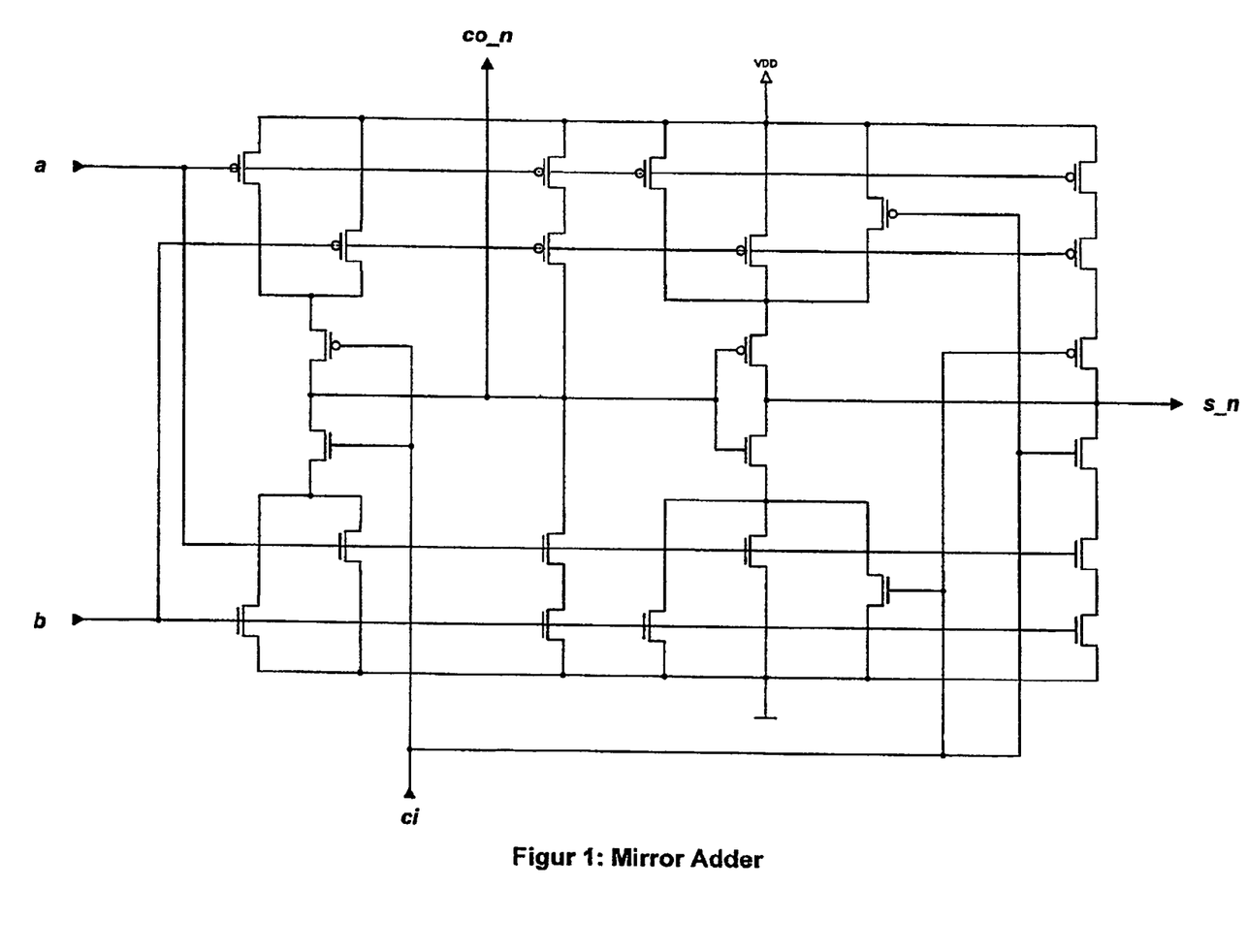
FIG. 1 shows a prior art mirror adder.

FIG. 1 shows a so-called "mirror adder", a conventional full adder cell 10 which implements the equations $$co\_n = \overline{a \cdot b + b \cdot ci + ci \cdot a} \quad (1)$$

$$s\_n = \overline{a \oplus b \oplus ci} \quad (2).$$

The mirror adder thus logically combines the two operand bits a and b and the carry-in bit ci in order to obtain the inverted carry-out bit co_n and the inverted sum bit s_n. In a standard-cell implementation of the mirror adder, co_n and s_n are usually additionally inverted by two inverters, respectively, one per output, such that the outputs of the mirror adder cell are usually the carry bit co and the sum bit s.

When output signals produced by a conventional full adder are supplied with masked input data, the equations $$y = a \cdot b + b \cdot c + c \cdot a \quad (3)$$

$$z = a \oplus b \oplus c \quad (4)$$

are transformed under the "masking operation", that is, the XOR combination $$\hat{x} = x \oplus k \quad (5)$$

of x=a, b and c with an OTP bit k.

One then obtains $\hat{a} \cdot \hat{b} + \hat{b} \cdot \hat{c} + \hat{c} \cdot \hat{a} = (a \cdot b + b \cdot c + c \cdot a) \oplus k = y \oplus k = \hat{y}$ and $\hat{a} \oplus \hat{b} \oplus \hat{c} = a \oplus b \oplus c \oplus k = z \oplus k = \hat{z}$. The "full adder equations" are form-invariant (covariant) under the "masking operation": from input data masked with k, the full adder computes output data which is also obtained when output data from unmasked input data is masked with k.

BRIEF DESCRIPTION OF THE DRAWINGS

The present invention will be described with respect to a preferred embodiment, in which.

DETAILED DESCRIPTION

Attempts to implement OTP masked ALU's using conventional standard cells have led to unacceptable values for the computing speed and energy expenditure. Because of this, commercial implementation of OTP-masked computation has been difficult.

One embodiment of the present invention provides a cell for an arithmetic logic unit comprising:
  a first input;
  a second input;
  a carry bit input;
  a first control input and a second control input;
  a circuit connected to the first input, the second input, the carry bit input, the first control input, and the second control input, the circuit having a first output and a second output;
  the second output having a first value as a function of the first input and the second input when the first control input and the second control input are supplied values equal to a value at the carry bit input, and having a second value as a function of the first input and second input when the values at the first control input and the second control input are independent of the value at the carry-in input.

A further embodiment of the present invention provides control circuitry for an ALU cell comprising:
  a mask bit input;
  a carry bit input; and
  a circuit outputting a masked carry bit and having two control outputs.

A further embodiment of the present invention also provides control circuitry for an ALU cell comprising:
  a current mask bit input;
  a previous mask bit input inputting the mask bit from an immediately upstream ALU cell;
  a carry bit input;
  two control bit inputs; and
  a circuit outputting a masked carry bit and having two control outputs as a function of the current mask bit input and the previous mask bit input.

In a further embodiment, the present invention provides a masked ALU cell comprising:
  a carry bit input;
  a mask bit input;
  a control circuit receiving the carry bit input and the mask bit input and outputting a masked carry bit, the control circuit having at least one control state; and
  a base circuit logically combining a first input, a second input and the masked carry bit to logically add the first input, the second input and the masked carry bit when the control circuit is in a first of control state.

In yet another embodiment, the present invention provides a masked ALU cell comprising:
  a carry bit input;
  a mask bit input;
  a control circuit receiving the carry bit input and the mask bit input and outputting a masked carry bit, the control circuit having at least four control states; and
  a base circuit logically combining a first input, a second input and the masked carry bit to: (a) logically add the first input, the second input and the masked carry bit when the control circuit is in a first state of the four control states, (b) logically XNOR the first input and second input when the control circuit is in a second state of the four control states; (c) logically NAND the first input and second input when the control circuit is in a third state of the four control states and logically NOR the first input and second input when the control circuit is in a fourth state of the four control states.

The present invention also provides a method for logically combining two inputs in a masked ALU cell comprising:
receiving a carry bit from an adjacent upstream ALU cell;
masking the carry bit by performing an exclusive-or on the carry bit with a mask bit; and
controlling an ALU cell to logically perform either adding two inputs and the masked carry bit in the ALU cell or performing bitwise one of an XNOR, or NAND or NOR on the two inputs.

The present invention provides a mirror adder, control circuitry and methods suited especially well for standard cell implementation. The ALU cell of the present invention not only provides the arithmetic function of (one-bit) addition of two binary numbers (the two operands), but also is programmable by suitable control signals so as to perform logical operations, namely bitwise XNOR or NAND or NOR operations, on the two operands. When suitably inverting the operands or the result, it is then possible to implement any possible bitwise logical operations as well as arithmetic operations. Moreover, all these operations are intended to be performed such that all data (operands, carries (carry-ins/carry-outs), and results) are XOR-masked using time-variant OTP masks.

Compared to an OTP implementation using conventional standard cells, this means significantly higher computing speeds (by more than 100%) and significantly lower energy expenditure.

Figure 2:
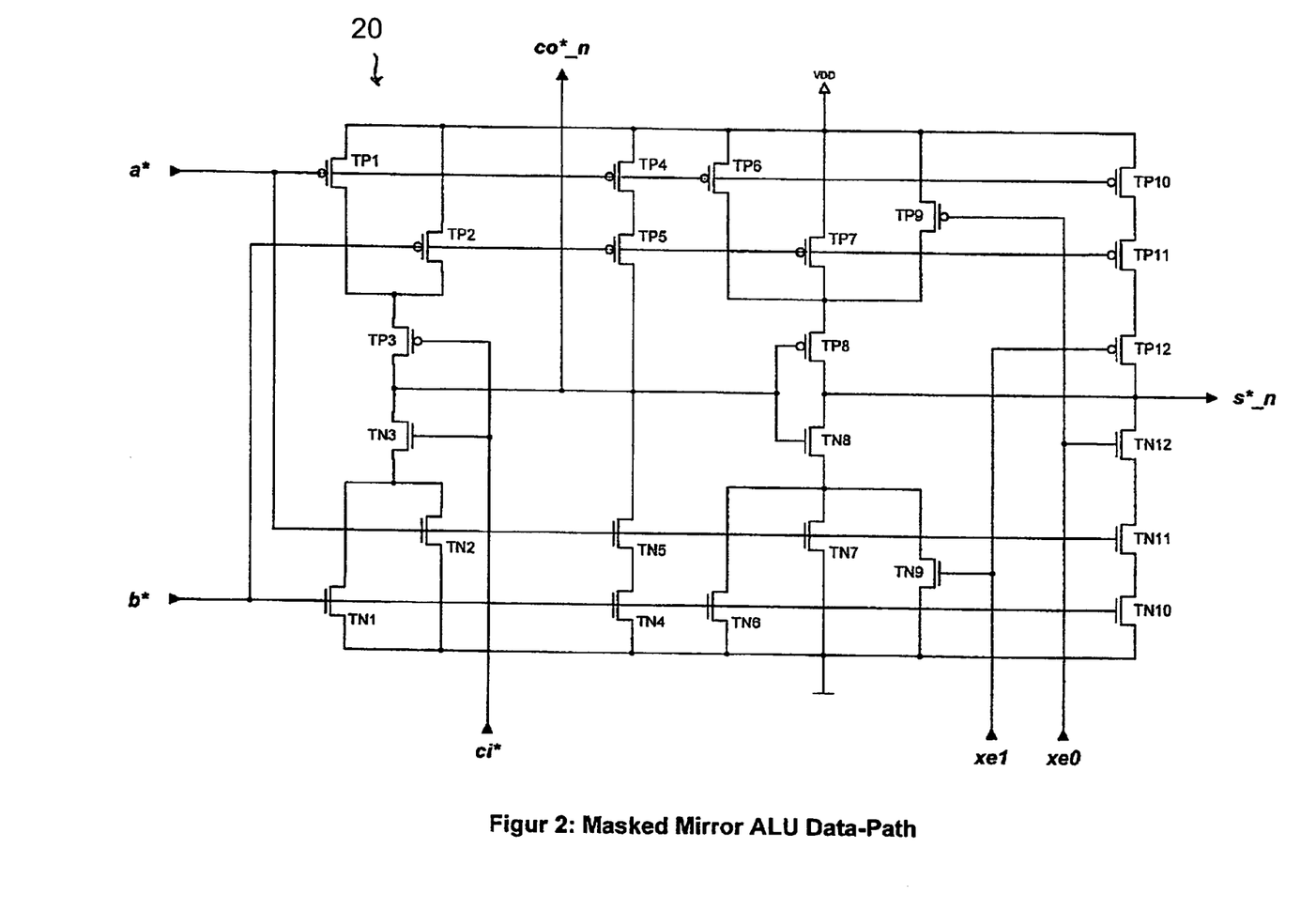
FIG. 2 shows a masked mirror adder according to the present invention.

FIG. 2 shows a possible mirror adder implementation 20 in CMOS according to the present invention, with transistors TP1 to TP12 and TN1 to TN12. According to a feature of the present invention, rather than being connected to the carry-in bit ci, as in the prior art, the transistors TN9 and TP12 are connected to an input control signal xe1; and transistors TN12 and TP9 are connected to an input control signal xe0.

From this, it follows that the relationship between co*_n and a*, b* and ci* in FIG. 2 is the same as that between co_n and a, b, and ci in FIG. 1:

$$co^*\_n = \overline{a^* \cdot b^* + b^* \cdot ci^* + ci^* \cdot a^*} \quad (6)$$

and, secondly, that the equation for s*_n in FIG. 2 is:

$$s^*\_n = \overline{a^* \oplus b^* \oplus ci^*} \quad (7)$$
when
$xe1 = xe0 = ci^*$,
and, respectively, $$s^*\_n = co^*\_n = \overline{a^* \cdot b^* + b^* \cdot ci^* + ci^* \cdot a^*} \quad (8)$$
for
$xe1 = 1, xe0 = 0$ Other values for xe1 and xe0 are not needed in this embodiment.

With the definition $$y^* = y \oplus k_p, \quad (9)$$

(where $k_p$ denotes the mask bit for bit position p) for masked data, it follows from the covariance of the full adder equations under the masking operation, first of all, that the circuit specified in FIG. 2 has the properties required for calculating (6) the masked carry-out co*_n from the masked inputs a*, b* and ci*.

As for the inverted sum bit s*_n, i.e., the equations (7) and (8), (7) represents the conventional (covariant) full adder equation for the inverted sum bit if ci* denotes the carry bit masked with $k_p$ of bit position p−1.

However, if it is provided that the carry-in bit ci* for bit position p is set to the inverse to mask bit $k_p$ ($\overline{k_p}$), it follows that (7) implements the $k_p$-masked XNOR operations on a* and b*

$$s^*\_n = \overline{a^* \oplus b^* \oplus \overline{k_p}} = a^* \oplus b^* \oplus k_p$$
for
$$ci^* = \overline{k_p}.$$

Alternatively to equation (7), or to the ADD, and XNOR operations, as described above, the operations NAND and NOR can be implemented by (8). To this end, in addition to the conditions xe1=1, xe0=0 for the validity of (8), it should again be provided that the carry-in bit ci* for bit position p is equal to mask bit $k_p$ or to its inverse $\overline{k_p}$, respectively. If so, it follows that (8) implements the $k_p$-masked NAND and NOR operations on a* and b*, respectively:

$$s^*\_n = \overline{a^* \cdot b^* + (a^* + b^*) \cdot ci^*} =$$
$$= \overline{(a \oplus k_p) \cdot (b \oplus k_p) + (a \oplus k_p + b \oplus k_p) \cdot k_p} =$$
$$= \overline{a \cdot b \cdot \overline{k_p} + \overline{a \cdot b} \cdot k_p} =$$
$$= \overline{(a \cdot b) \oplus k_p} =$$
$$= (a \cdot b)^*$$

for
$ci^* = k_p,$ and, respectively, $$s^*\_n = \overline{a^* \cdot b^* + (a^* + b^*) \cdot ci^*} =$$
$$= \overline{(a \oplus k_p) \cdot (b \oplus k_p) + (a \oplus k_p + b \oplus k_p) \cdot \overline{k_p}} =$$
$$= \overline{(a + b) \cdot \overline{k_p} + \overline{a + b} \cdot k_p} =$$
$$= \overline{(a + b) \oplus k_p} =$$
$$= (a + b)^*$$

for
$$ci^* = \overline{k_p}.$$

Figure 3:
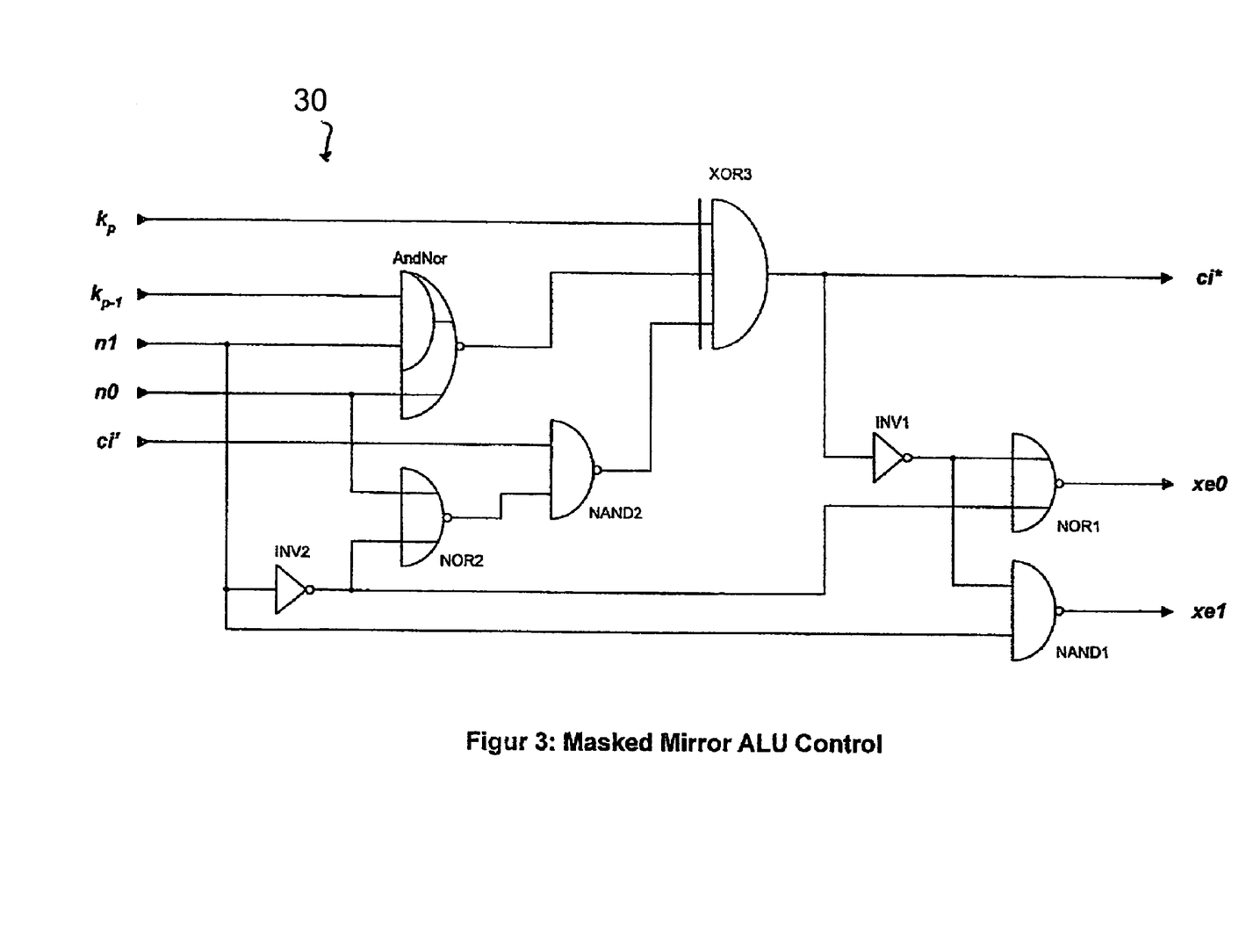
FIG. 3 shows ALU control circuitry for the masked mirror adder of FIG. 2.

FIG. 3 shows a control circuit 30 by which the value combinations for xe1, xe0 and ci* specified above for the implementation of the various operations can be generated as a function of the mask bits $k_p$ (of the bit position p associated with the currently considered ALU cell) and $k_{p-1}$, (of the bit position p−1 whose carry-out bit $co_{p-1}$ represents the carry-in bit of bit position p), the carry-in bit ci and the control signals n1 and n0.

The following table summarizes the generation of xe1, xe0 and ci*:

| n1 | n0 | Ci*$_p$ | xe1 | xe0 | Operation | s*_n |
|---|---|---|---|---|---|---|
| 1 | 0 | ci'$\oplus k_{p-1} \oplus k_p$ | ci*$_p$ | ci*$_p$ | ADD | $\overline{a^* \oplus b^* \oplus ci^*}$ |
| 1 | 1 | $\overline{k_p}$ | ci*$_p$ | ci*$_p$ | XNOR | $(a \oplus b)^*$ |
| 0 | 0 | $k_p$ | 1 | 0 | NAND | $(a \cdot b)^*$ |
| 0 | 1 | $\overline{k_p}$ | 1 | 0 | NOR | $(a + b)^*$ |

Figure 4:
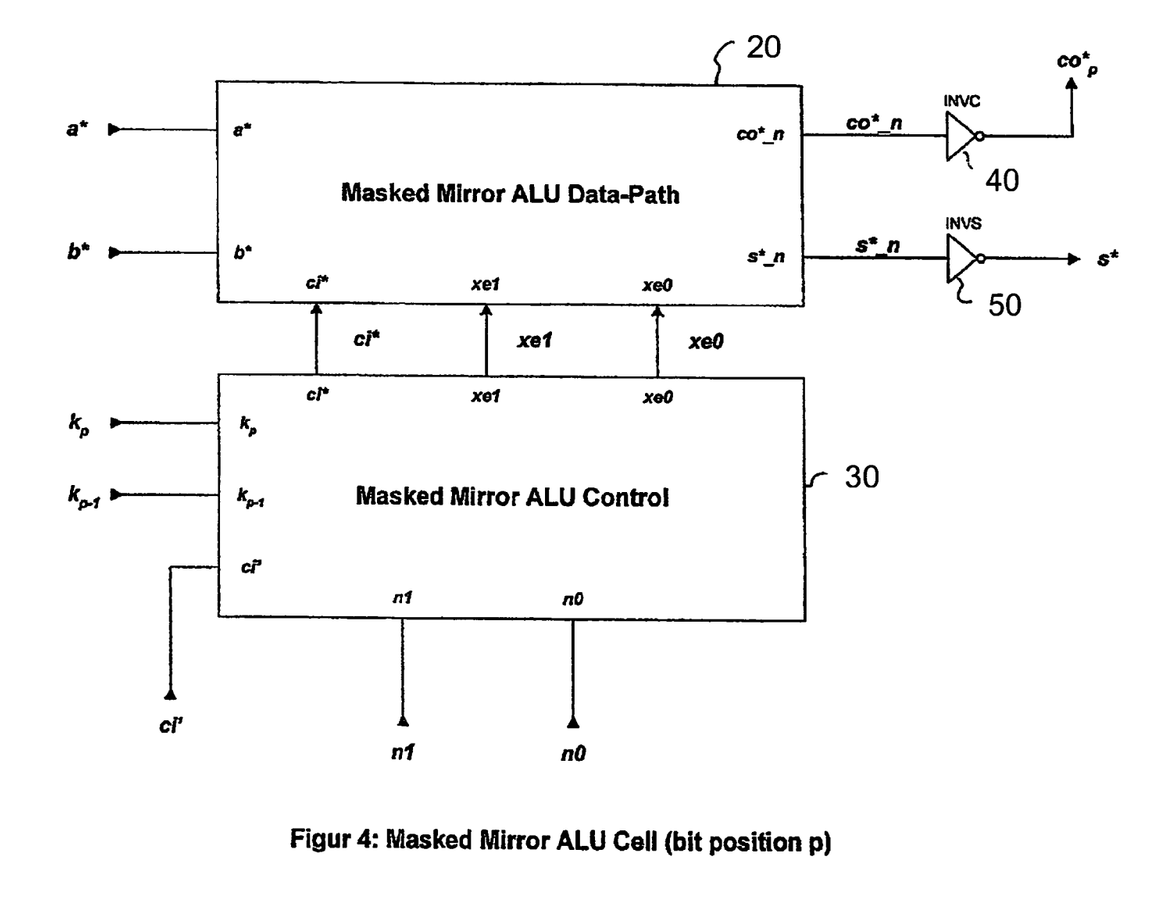
FIG. 4 shows the controlled cell and the interaction of the control circuitry of FIG. 3 with the adder of FIG. 2.

FIG. 4 shows the generation of $$ci' = \overline{co^*_{p-1} - n},$$

by means of an inverter (INVC 40), as well as the interconnection of the subcircuits 20, 30 shown in FIGS. 2 and 3 of the masked mirror ALU cell of the present invention. The value co*_in is input to an inverter 40 to generate the carry bit for the next downstream cell, so that co*$_p$ becomes ci' for the next cell. s*_n can pass through an inverter 50 to form s*.

All circuit elements included FIG. 4 or its subfigures can be integrated physically (in the layout) into one unit, in an extension of conventional standard cell libraries. This, together with the minimal number of transistors and the small number and small electrical capacitance of the switching nodes, is the reason for the high computing speed and the low energy expenditure of this cell.

Figure 5:
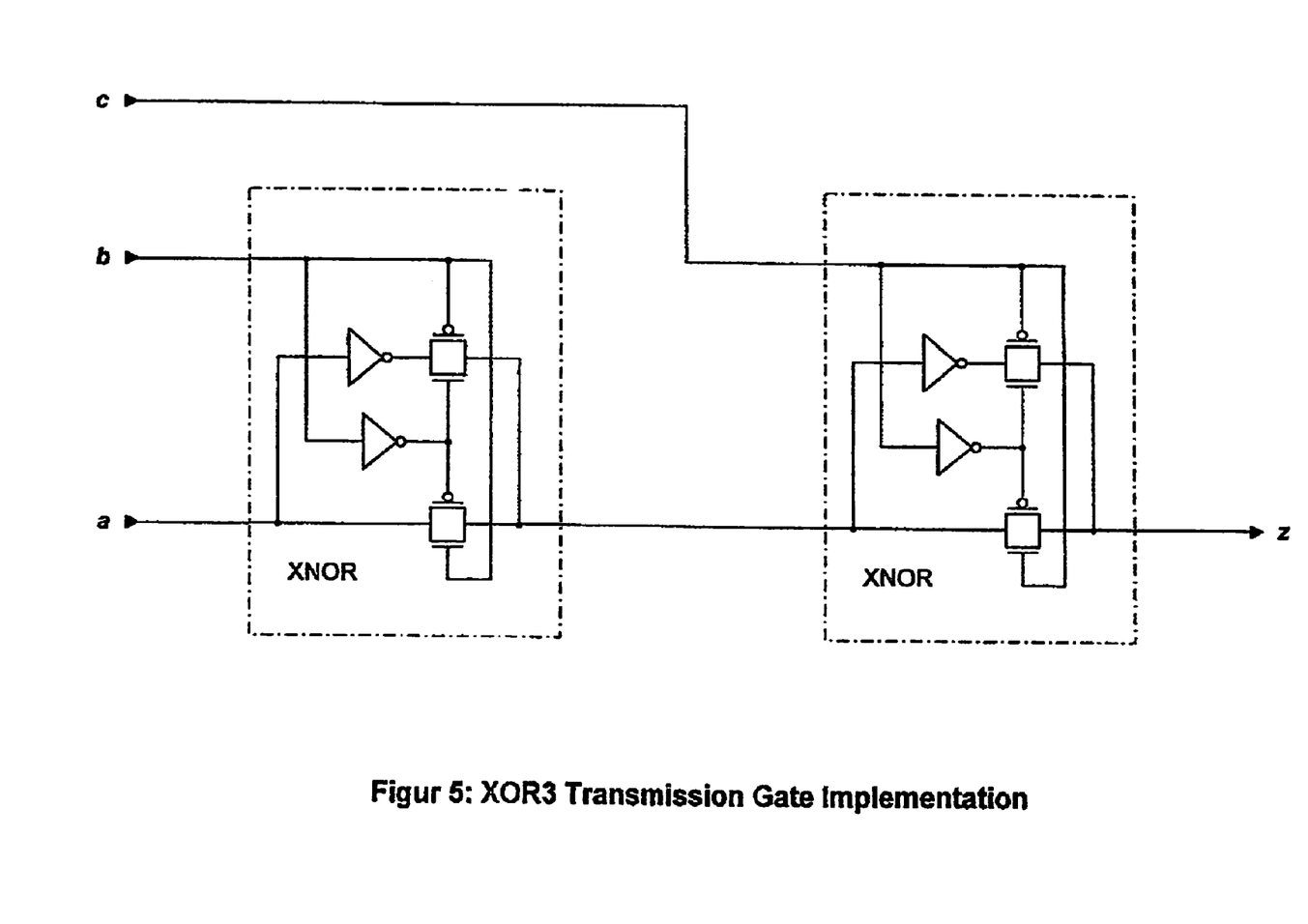
FIG. 5 shows a possible implementation for the XNOR3 gate of FIG. 3.
Figure 6:
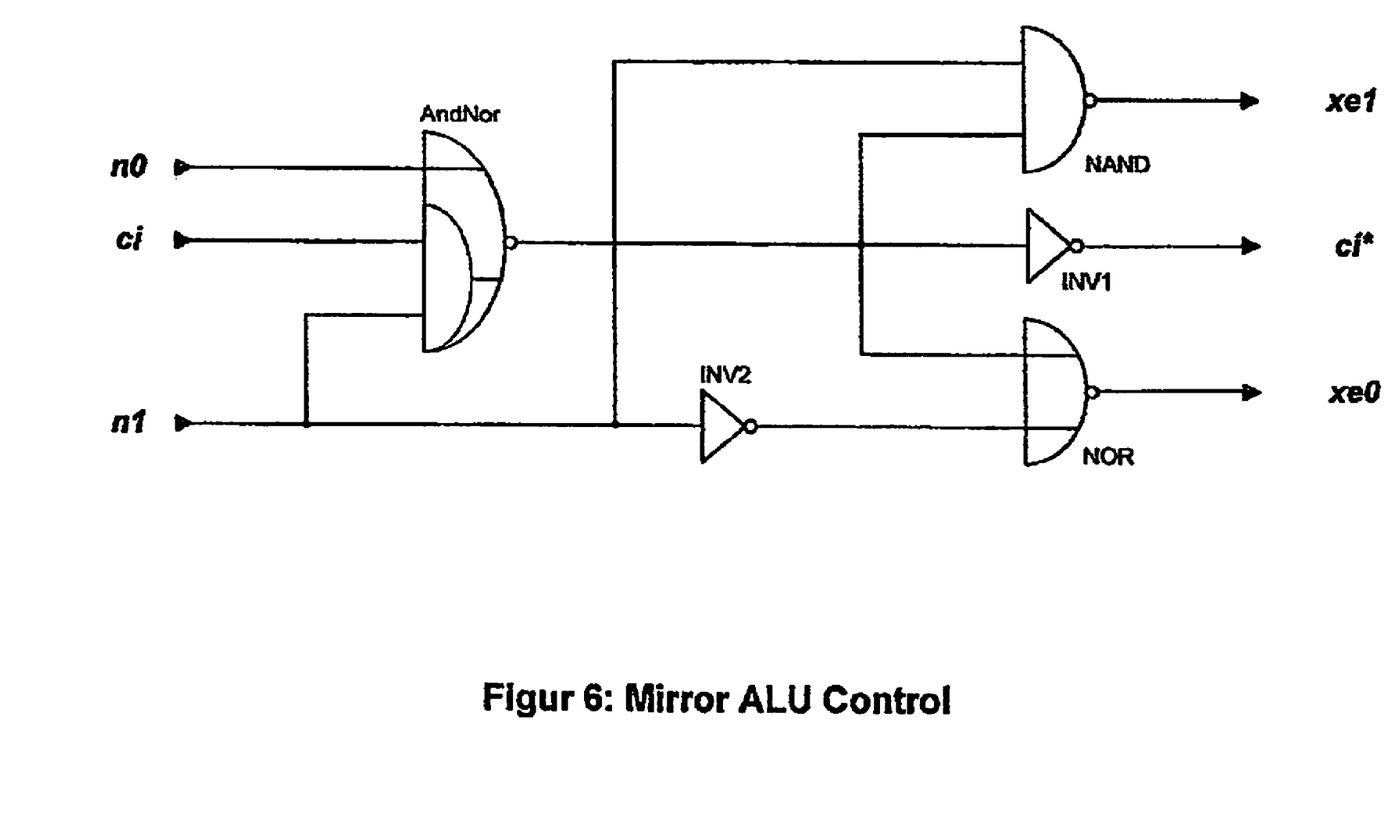
FIG. 6 shows ALU control logic circuitry without masking.

FIG. 5 illustrates an advantageous implementation of the XNOR3 circuit symbolically shown in FIG. 3, using the so-called "transmission gate" design style. From the "masked mirror ALU" cell according to the invention shown in FIGS. 2 to 4, it is easy to derive the variant of a "masked mirror ALU" cell without masking, that is to say, for $k_p \equiv 0 \forall p$. The control logic, which is simplified in comparison to FIG. 3, is shown in FIG. 6.

What is claimed is:

1. A cell for an arithmetic logic unit comprising:
  a mirror adder circuit comprising:
    a first masked input a*;
    a second masked input b*;
    a masked carry bit input ci*;
    a first control input xe0 and a second control input xe1; and
    a circuit connected to the first masked input a*, the second masked input b*, the masked carry bit input ci*, the first control input xe0, and the second control input xe1, the circuit having a first output co*_n and a second output s*_n,
    wherein the mirror adder circuit comprises a plurality of transistors, wherein the masked carry bit input ci*, the first control input xe0 and the second control input xe1 are applied to different ones of the transistors of the mirror adder circuit; and
  a control unit connected to the circuit, the control unit having a first mask bit input $k_p$, a second mask bit input $k_{p-1}$, a first control bit input n0, and a second control bit input n1,
    wherein the control unit is configured to generate values for the masked carry bit input ci*, the first control input xe0 and the second control input xe1 as a function of values of the first mask bit input $k_p$, the second mask bit input $k_{p-1}$, the first control bit input n0 and the second control bit input n1,
    wherein, to implement a first operation, the control unit is configured to generate the values of the first control input xe0 and the second control input xe1 to correspond to the value of the masked carry bit input ci* so that the second output is an inverted masked sum bit s*_n of a masked arithmetic addition of the first masked input a*, the second masked input b* and the masked carry bit input ci*, and the first output co*_n is a masked inverted carry-out bit.

2. The cell as recited in claim 1 wherein, to implement a second operation, the control unit is configured to generate the values for the masked carry bit input ci*, the first control input xe0 and the second control input xe1 so that the second output is a masked XNOR of the first masked input a* and the second masked input b*.

3. The cell as recited in claim 1 wherein, to implement a third or forth operation, the control unit is configured to generate the values for the masked carry bit input ci*, the first control input xe0 and the second control input xe1 so that the second output is an inverted masked sum bit s*_n of a masked NAND or NOR of the first masked input a* and second masked input b*.

4. The cell as recited in claim 3 wherein the first control input xe0 is a logical zero and the second control input xe1 is a logical one.

5. The cell as recited in claim 1 further comprising:
  a first inverter having a carry bit output co*$_p$ based on the first output co*_n.

6. The cell as recited in claim 1 wherein values of the first control input xe0 and the second control input xe1 are altered by the control unit.

7. A processor comprising a plurality of cells as recited in claim 1.

8. A circuitry for an ALU cell comprising:
  a first mask bit input $k_{p-1}$;
  a second mask bit input
  a masked carry bit input ci';
  two control bit inputs n0, n1; and
  a circuit outputting a remasked carry bit ci* as a function of the first mask bit input $k_p$, the second mask bit input $k_{p-1}$ the masked carry bit input ci', and the two control bit inputs n0, n1, the circuit having two control outputs xe0, xe1,
    wherein, to implement a first operation, the circuit is configured to generate the values of the first control output xe0 and the second control output xe1 to correspond to the value of the remasked carry bit ci*.

9. The circuitry as recited in claim 8 further comprising a data unit comprising:
  a first masked input a*;
  a second masked input b*; and
  a circuit outputting a masked inverted carry-out bit co*_n and a masked inverted sum bit s*_n based on the first masked input a*, the second masked input b*, and the remasked carry bit ci*.

10. A control circuitry for an ALU cell comprising:
  a current mask bit input $k_p$;
  a previous mask bit input $k_{p-1}$ inputting the mask bit from an immediately upstream ALU cell;
  a masked carry bit input ci'; and
  a circuit outputting a remasked carry bit ci* as a function of the current mask bit input $k_p$, the previous mask bit input $k^{p-1}$ and the masked carry bit input ci', the circuit having two control outputs xe0, xe1 as a function of the current mask bit input $k_p$ and the previous mask bit input $k_{p-1}$,
    wherein, to implement a first operation, the circuit is configured to generate the values of the first control output xe0 and the second control output xe1 to correspond to the value of the remasked carry bit ci*.

11. The control circuitry as recited in claim 10 further comprising two control bit inputs n0, n1, and wherein the circuit outputs the remasked carry bit ci* also as a function of the two control bit inputs n0, n1.

12. A processing unit comprising:
  a control unit adapted to generate a remasked carry input ci*, a first control input xe0, and a second control input xe1 as a function of a first control bit input n0 and a second control bit input n1, wherein the control unit is configured to generate the first control input xe0 and the second control input xe1 to correspond to the remasked carry input ci*; and a data unit adapted to generate a masked inverted carry output co*_n and a masked inverted sum bit s*_n based on the remasked carry input ci*, the first control input xe0, and the second control input xe1.

13. The processing unit of claim 12, wherein the control unit is adapted to generate the remasked carry input ci* from a function of a masked carry bit input ci', a first masked input $k_p$, a second masked input $k_{p-1}$, the first control bit input n0, and the second control bit input n1.

14. The processing unit of claim 13, wherein the data unit is adapted to generate the masked inverted carry output co*_n from a first masked input a*, a second masked input b*, and the remasked carry input ci*.

15. The processing unit of claim 12, wherein the data unit is adapted to generate the masked inverted sum bits s*_n from the masked carry input ci*, a first masked input a*, a second mask input b*.

16. The processing unit of claim 12, wherein the data unit is adapted to supply the masked inverted carry output co*_n to a downstream processing unit as a carry bit input ci'.

17. The processing unit of claim 14, wherein the first masked input a*, a second masked input b*, the masked carry input ci*, and the masked inverted carry output co*_n share the first mask input $k_p$.

* * * * *